United States Patent
Bruckman

(10) Patent No.: US 7,697,552 B2
(45) Date of Patent: Apr. 13, 2010

(54) MAC ADDRESS SCALABILITY IN INTERCONNECTED RINGS

(75) Inventor: Leon Bruckman, Petah Tikva (IL)

(73) Assignee: Corrigent Systems Ltd., Tel Aviv (IL)

(*) Notice: Subject to any disclaimer, the term of this patent is extended or adjusted under 35 U.S.C. 154(b) by 284 days.

(21) Appl. No.: 11/764,764

(22) Filed: Jun. 18, 2007

(65) Prior Publication Data

US 2008/0107125 A1 May 8, 2008

Related U.S. Application Data

(60) Provisional application No. 60/857,285, filed on Nov. 6, 2006.

(51) Int. Cl.
*H04L 12/66* (2006.01)
(52) U.S. Cl. .................. 370/405; 370/223; 370/404; 370/424
(58) Field of Classification Search ............ 370/405, 370/223, 404, 424
See application file for complete search history.

(56) References Cited

U.S. PATENT DOCUMENTS

| | | | |
|---|---|---|---|
| 6,091,705 A * | 7/2000 | Regula ............... | 370/223 |
| 6,807,172 B1 | 10/2004 | Levenson et al. | |
| 6,829,651 B1 | 12/2004 | Bass et al. | |
| 7,009,974 B1 | 3/2006 | Fotedar | |
| 7,016,979 B2 * | 3/2006 | He et al. ............ | 709/246 |
| 2003/0012129 A1 | 1/2003 | Lee et al. | |
| 2004/0165525 A1 | 8/2004 | Burak | |
| 2005/0243823 A1 | 11/2005 | Griswold et al. | |
| 2006/0056425 A1 | 3/2006 | Wu et al. | |
| 2006/0059325 A1 | 3/2006 | Milne et al. | |
| 2006/0098571 A1 | 5/2006 | Takefman | |
| 2006/0109802 A1 | 5/2006 | Zelig et al. | |

OTHER PUBLICATIONS

Part 17: Resilient Packet Ring (RPR) Access Method & Physical Layer Specifications, www.ieee802.org/17.
Kompella et al., "Virtual Private LAN Service," (2005) www.ietf.org/internet-drafts.
Lasserre et al., "Virtual Private LAN Services over MPLS," www.ietf.org/internet-drafts (2005).

* cited by examiner

*Primary Examiner*—Dang T Ton
*Assistant Examiner*—Pamit Kaur
(74) *Attorney, Agent, or Firm*—Darby & Darby P.C.

(57) ABSTRACT

A method for communication is used in a communication network that includes multiple ring nodes arranged in at least first and second ring networks, which are connected by one or more of the ring nodes serving as interconnect nodes. A data packet is accepted from a source user node served by the first ring network, for forwarding to a destination user node served by the second ring network. An identifier, which identifies an interconnect node in the first ring network through which the data packet is to be forwarded to the second ring network, is attached to the data packet in the first ring network. The data packet is forwarded over the first ring network, accepted at the interconnect node and, responsively to the identifier, forwarded from the interconnect node to the second ring network. The data packet is forwarded over the second ring network to the destination user node.

22 Claims, 5 Drawing Sheets

MAC ADDRESS SCALABILITY IN INTERCONNECTED RINGS

CROSS-REFERENCE TO RELATED APPLICATIONS

This application claims the benefit of U.S. Provisional Patent Application 60/857,285, filed Nov. 6, 2006, whose disclosure is incorporated herein by reference.

FIELD OF THE INVENTION

The present invention relates generally to communication networks, and particularly to methods and systems for communicating over interconnected ring networks.

BACKGROUND OF THE INVENTION

Communication networks sometimes employ ring configurations. For example, some networks comprise Resilient Packet Ring (RPR) configurations, as defined by the IEEE standard 802.17, entitled "Part 17: Resilient Packet Ring (RPR) Access Method & Physical Layer Specifications," which is incorporated herein by reference. Additional details regarding RPR network configurations and standards are available at www.ieee802.org/17.

Various communication services can be provided over ring networks. For example, a virtual private local area network service (VPLS) links different local area networks (LANs) together over an Internet Protocol (IP) network. VPLS methods are described, for example, by Kompella et al., in "Virtual Private LAN Service" (IETF draft-ietf-l2vpn-vpls-bgp-06.txt, December, 2005) and by Lasserre et al., in "Virtual Private LAN Services over MPLS" (IETF draft-ietf-l2vpn-vpls-ldp-08.txt, November, 2005), which are incorporated herein by reference. These drafts are available from the Internet Engineering Task Force (IETF) at www.ietf.org/internet-drafts. VPLS is also sometimes referred to as E-LAN or layer-2 Virtual Private Network (VPN).

U.S. Patent Application Publication 2006/0109802, whose disclosure is incorporated herein by reference, describes a method for delivering VPLS over ring networks. A data packet transmitted over a VPLS is received at a first node in the ring network. The data packet includes an identification of the VPLS. The first node reads the identification from the data packet. Responsively to reading the identification, the first node forwards the data packet to at least one second node in the ring network that is associated with the VPLS.

SUMMARY OF THE INVENTION

Embodiments of the present invention provide a method for communication, including:

in a communication network that includes multiple ring nodes arranged in at least first and second ring networks, which are connected by one or more of the ring nodes serving as interconnect nodes, accepting a data packet from a source user node served by the first ring network for forwarding to a destination user node served by the second ring network;

attaching to the data packet in the first ring network an identifier that identifies an interconnect node in the first ring network through which the data packet is to be forwarded to the second ring network, and forwarding the data packet over the first ring network;

accepting the data packet at the interconnect node, and responsively to the identifier, forwarding the data packet from the interconnect node to the second ring network; and forwarding the data packet over the second ring network to the destination user node.

In some embodiments, the first and second ring networks conform to a Resilient Packet Ring (RPR) standard. In an embodiment, the data packet is associated with a Virtual Private Local Area Network Service (VPLS).

In another embodiment, forwarding the data packet includes stripping the data packet from the first ring network and forwarding the data packet to the second ring network when the identifier identifies the interconnect node, and passing the data packet over the first ring network when the identifier does not identify the interconnect node.

In yet another embodiment, the source user node is served by a first ring node in the first ring network, the destination user node is served by a second ring node in the second ring network, and attaching the identifier includes learning at the first ring node that the data packet is to be forwarded to the second ring network through the interconnect node based on a previous data packet, which originated in another source user node served by the second ring node, was addressed to another destination user node served by the first ring node and was forwarded through the interconnect node.

In still another embodiment, learning that the data packet is to be forwarded through the interconnect node includes accepting the previous data packet by the interconnect node, attaching the identifier that identifies the interconnect node to the previous data packet, forwarding the previous data packet over the first ring network to the first ring node, forming at the first ring node an association between a Medium Access Control (MAC) address of the second ring node and the identifier, and storing the association in a MAC table at the first ring node.

In a disclosed embodiment, learning that the data packet is to be forwarded through the interconnect node includes accepting the previous data packet by the interconnect node over a port, and learning that subsequent data packets to the second ring node are to be forwarded to the second ring network over the port. Learning that the subsequent data packets to the second ring node are to be forwarded over the port may include forming an association between the port and a Medium Access Control (MAC) address of the second ring node, and storing the association in a MAC table at the interconnect node.

In some embodiments, the previous data packet includes a flooded data packet having a multicast destination address. The multicast destination address may have a limited multicast scope. In an embodiment, attaching the identifier includes embedding the identifier in one of a Virtual Local Area Network (VLAN) tag, a Multi-Protocol Label Switching (MPLS) label and a Resilient Packet Ring (RPR) header of the data packet.

In another embodiment, forwarding the data packet over the first ring network includes pre-configuring a path between a ring node serving the source user node in the first ring network and the interconnect node, and forwarding the data packet over the pre-configured path.

There is additionally provided, in accordance with an embodiment of the present invention, a communication network including first and second pluralities of ring nodes arranged in respective first and second ring networks, the first plurality of nodes including:

an interconnect node, which is connected by a communication link to at least one of the nodes in the second plurality; and a first ring node, which is configured to accept a data packet from a source user node for forwarding to a destination user node served by a second ring node in the second ring network, to attach to the data packet an identifier that identifies the interconnect node in the first ring network through which the data packet is to be forwarded to the second ring network, and to forward the data packet over the first ring network, wherein the interconnect node is arranged to accept the data packet, and responsively to the identifier, to forward the data packet to the second ring network, so as to forward the data packet over the second ring network to the destination user node via the second ring node.

The present invention will be more fully understood from the following detailed description of the embodiments thereof, taken together with the drawings in which:

DETAILED DESCRIPTION OF EMBODIMENTS

Overview

Figure 1:
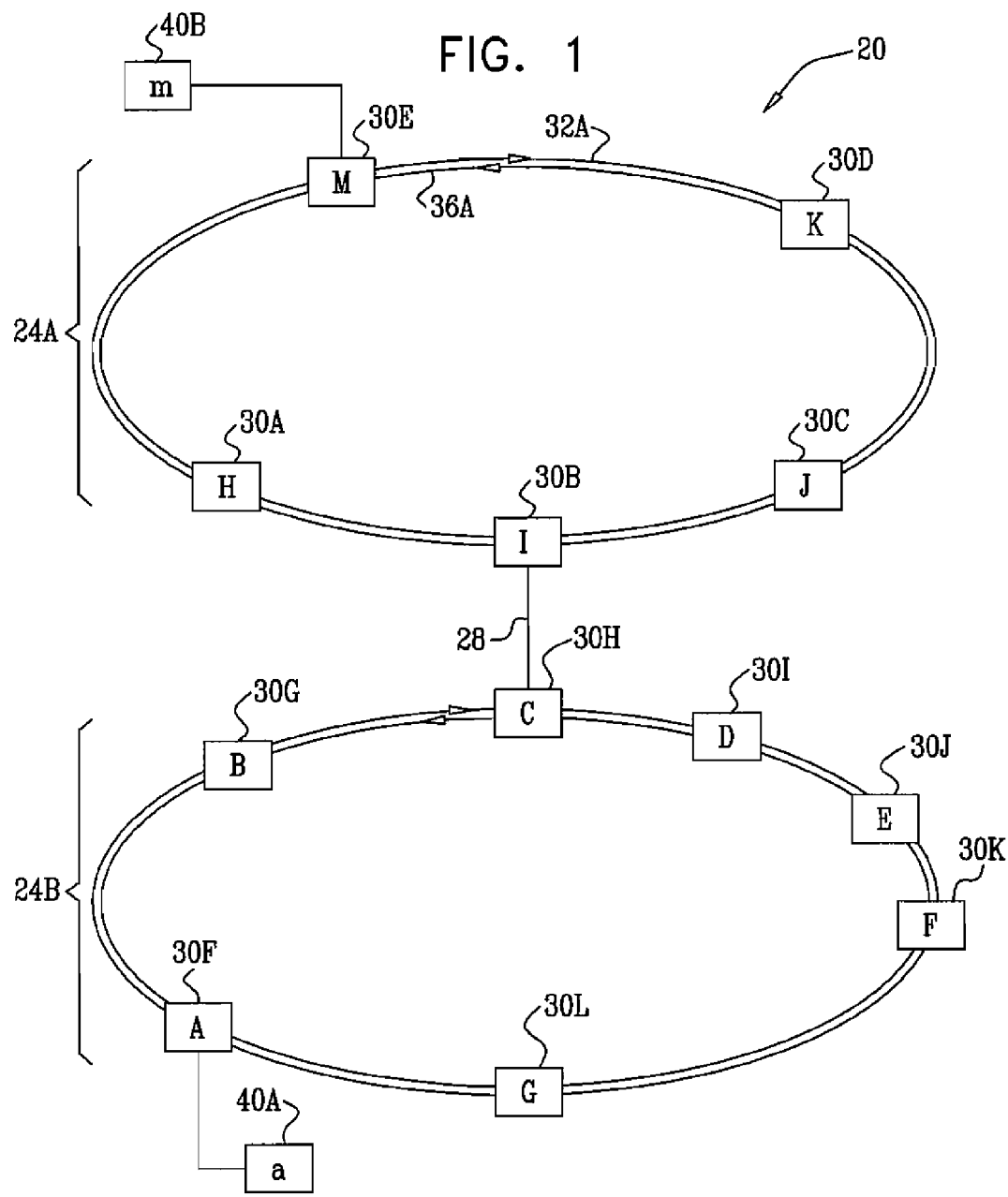
FIG. 1 is a block diagram that schematically illustrates a communication network, in accordance with an embodiment of the present invention.

Some network configurations comprise interconnected rings, i.e., two or more ring networks that are connected to one another. Each ring network comprises ring nodes, which provide communication services to user nodes. The ring nodes through which the ring networks are connected to one another are referred to as interconnect nodes.

The ring nodes typically perform various bridging functions in the network. In particular, the ring nodes learn the port over which a packet addressed to a certain Medium Access Control (MAC) address should be forwarded, in a process commonly known as MAC learning. Each ring node maintains a database, referred to as a MAC table, which maps destination MAC addresses of the packets the node receives to ports of the node.

When using some known bridging and forwarding methods, the ring nodes learn large numbers of MAC addresses and maintain large MAC tables. In particular, interconnect nodes are often required to maintain a MAC table entry per each user node of each VPLS instance that is defined in the network. Since in many practical scenarios the network may comprise large numbers of user nodes and VPLS instances, these known bridging and forwarding methods may have problems of scalability of the MAC learning process carried out by the interconnect nodes.

Embodiments of the present invention that are described herein provide improved methods and systems for forwarding packets over interconnected ring networks. In some embodiments, each interconnect node is assigned a unique identifier. Packets that originate in one ring (denoted the source ring) and are destined to another ring (denoted the destination ring) are marked with an interconnect identifier (IID), which identifies the interconnect node in the source ring via which the packet is to be forwarded to the destination ring. When the packet is sent over the source ring and reaches an interconnect node, the interconnect node extracts the IID and compares it with its own identifier. If the values match, the interconnect node makes a decision to strip the packet from the source ring and forward it to the destination ring. Otherwise, the interconnect node passes the packet along the ring without further processing. The interconnect node makes the forwarding decision based only on the value of the interconnect identifier attached to the packet.

When the interconnect node in the destination ring accepts a packet from the source ring, the node attaches its own IID to the packet, for use in the MAC learning process of the ring nodes in the destination ring. The decision rules and logic defined herein are typically added on top of the conventional copy/strip rules carried out by the ring nodes.

As will be explained and demonstrated below, the methods and systems described herein enable the interconnect nodes to learn only the MAC addresses of the edge nodes (i.e., the ring nodes that serve the user nodes) and not of the user nodes themselves. Since the number of edge nodes is usually considerably smaller than the number of user nodes, the size of the MAC tables in the interconnect nodes can be reduced significantly. In some embodiments, the interconnect nodes can learn the edge node MAC addresses regardless of the VPLS instances they may or may not serve, instead of learning MAC addresses separately per VPLS instance. This feature further reduces the number of MAC addresses learned by the interconnect nodes and the size of their MAC tables.

Thus, the methods and systems described herein provide a scalable solution, which enables the interconnect nodes to handle manageable-size MAC tables. This goal is achieved while incurring only a small overhead for adding the interconnect identifiers to the packets, and while preserving the spatial reuse of the ring networks.

System Description

FIG. 1 is a block diagram that schematically illustrates a communication network 20, in accordance with an embodiment of the present invention. Network 20 comprises two ring networks 24A and 24B that are interconnected with one another via an interconnecting link 28. Typically, network 20 comprises a Wide Area Network (WAN) or a Metropolitan Area Network (MAN).

In the present example, each ring network operates in accordance with the IEEE 802.17 RPR specification, cited above. Ring 24A comprises multiple ring nodes 30A . . . 30E, which are connected by two unidirectional ringlets 32A and 36A. The ringlets transfer data packets between neighboring ring nodes in opposite directions. Similarly, ring 24B comprises ring nodes 30F . . . 30L that are connected by ringlets 32B and 36B. Ring nodes 30B and 30H, through which the two ring networks are connected, are also referred to as interconnect nodes.

Network 20 provides communication services to user nodes. In the present example, two user nodes 40A and 40B are connected to ring nodes 30F and 30E, respectively. In particular, network 20 provides Virtual Private Local Area Network Services (VPLS) to the user nodes. VPLS enables distant user nodes to communicate via network 20 as if they are connected via a bridged Local Area Network (LAN).

Figure 2:
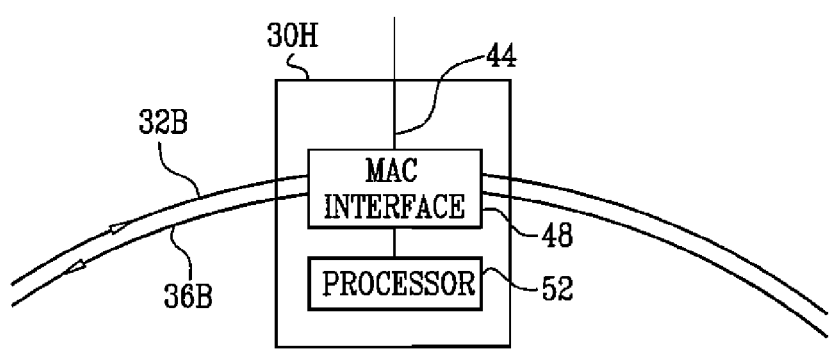
FIG. 2 is a block diagram that schematically illustrates details of a ring node, in accordance with an embodiment of the present invention.

FIG. 2 is a block diagram that schematically illustrates details of ring node 30H, in accordance with an embodiment of the present invention. Node 30H is shown in detail purely by way of example, and the configuration of FIG. 2 is suitable for any other ring node in network 20, regardless of whether it serves as an interconnect node (e.g., nodes 30B and 30H of FIG. 1), an edge node (e.g., nodes 30E and 30F of FIG. 1), or a ring node that does not serve any user nodes (e.g., nodes 30A or 30L of FIG. 1).

The ring node comprises an external port 44, through which the node sends and receives packets to and from off-ring nodes, i.e., to and from nodes that are outside of the ring to which the ring node belongs. Although FIG. 2 shows a single external port, a ring node may generally comprise multiple external ports. The ring node comprises a MAC interface 48, via which the node exchanges packets with the external port and with the two ringlets. The node further comprises a processor 52, which carries out the different packet processing functions described herein. The functions carried out by processor 52 can be implemented in hardware, in software, or as a combination of hardware and software elements.

Packet Forwarding over Interconnected Rings

When implementing VPLS over a ring network, the ring nodes perform various bridging functions. For example, the ring nodes learn the port over which a packet addressed to a certain Medium Access Control (MAC) address should be forwarded, in a process commonly known as MAC learning. Each ring node maintains a database, referred to as a MAC table, which maps destination MAC addresses of the packets the node receives to ports. The ring node builds the MAC table by means of a learning process, in which it associates the source MAC address of each incoming packet with the port on which the packet was received. When the ring node receives an incoming packet whose destination address is not located in the database, it broadcasts (floods) the packet through all its available ports, except the one through which the packet arrived. Other nodes that do not recognize the destination address will further broadcast the packet. Using the flooding mechanism, the packet will eventually traverse all interconnected nodes at least once, and will ultimately reach its destination. The ring nodes forward data packets in accordance with the learned MAC addresses.

When implementing such bridging functions, one of the prime considerations is spatial efficiency and spatial reuse of the ring segments. Exemplary methods that are sometimes used for this purpose are described in the IEEE 802.17b/D1.4 amendment entitled "Resilient Packet Ring (RPR) Access Method and Physical Layer Specifications—Amendment 1: Spatially Aware Sublayer," 2005, which is incorporated herein by reference. The amendment specifies methods for using the architecture and protocols of the IEEE 802.17 standard to offer improvements in bandwidth utilization, by means of spatial reuse, for applications of RPR that involve bridging clients. VPLS traffic is also sometimes transported over ring networks using various tunneling protocols, such as the well-known Multi-Protocol Label Switching (MPLS) protocol.

Although FIG. 1 shows only two user nodes for ease of explanation, network 20 typically serves a large number of user nodes. In a typical scenario, groups of user nodes communicate with one another via network 20 using multiple VPLS instances. Since the ring nodes act as bridges for the different VPLS instances, each ring node carries out a separate MAC learning process for each MAC address used in each VPLS instance served by the node. (Note that a certain MAC address can appear in multiple MAC tables when the corresponding user node participates in multiple VPLS instances.)

When using conventional IEEE 802.17b or tunnel-based methods, each ring node performs MAC learning only for VPLS instances that are defined in the node (i.e., VPLS instances that are used by the user nodes served by the node). For VPLS instances that are not defined in the ring node, the node passes the packets along the ring without copying or otherwise processing the packets. Thus, the size of the MAC table maintained by each ring node is kept manageable.

However, the conventional bridging and forwarding methods outlined above do not provide a scalable solution for the interconnect nodes in a configuration of interconnected rings. When using the conventional methods described above, the interconnect nodes are still required to perform MAC learning and maintain MAC table entries for a large number of VPLS instances. Typically, the interconnect nodes have to learn all the MAC addresses, which participate in all of the VPLS instances that have user nodes in both ring networks (i.e., all VPLS instances whose packets are forwarded over interconnecting link 28). In many practical network configurations, the total number of MAC addresses that the interconnect node has to learn can grow to unmanageable numbers.

In some networks, the number of MAC addresses learned by the ring nodes is reduced using a known method called "MAC-in-MAC," which is specified in IEEE draft amendment IEEE 802.1ah/D2.20 entitled "Draft Standard for Local and Metropolitan Area Networks—Virtual Bridged Local Area Networks—Amendment 6: Provider Backbone Bridges," Apr. 14, 2006, which is incorporated herein by reference. When using MAC-in-MAC methods, the ring nodes learn only the MAC addresses of the edge nodes (i.e., the ring nodes via which the packets enter and leave the network) and not of the user nodes. The edge nodes learn the MAC addresses of the user nodes they serve, per each served VPLS instance. In order to accomplish this differentiation, the edge node that serves the source user node encapsulates the packet with an additional encapsulation that includes its own MAC address as the source address (SA) and the MAC address of the destination edge node (the edge node that serves the destination user node) as the destination address (DA). The other ring nodes are only aware of the external DA and SA, and therefore learn only the MAC addresses of the edge nodes.

In the RPR topology, however, the ring nodes usually do not perform full bridging functionality, in order to reduce their cost and increase their processing speed. The decision, made by a ring node, whether to copy a packet addressed to the node or to continue passing it along the ring, is performed based on the RPR DA of the packet. Thus, in conventional RPR, if a packet is to be forwarded to another ring, the DA of the packet should be the RPR DA of the interconnect node. This requirement contradicts the 802.1ah MAC-in-MAC method, in which the DA is the DA of the edge node.

The solution defined by the 802.17 standard in this case would be to use the edge node destination MAC address as the RPR MAC address, and flood the packet around the ring. Using flooding in this case would allow using MAC-in-MAC methods, but at the expense of losing spatial reuse. Thus, the bandwidth efficiency of the ring is reduced considerably.

In summary, known bridging and forwarding methods do not provide a scalable solution for the MAC tables of interconnect nodes in interconnected ring configurations.

Embodiments of the present invention provide improved methods and systems for forwarding packets over interconnected ring networks. The methods and systems described herein enable the interconnect nodes (e.g., nodes 30B and 30H in FIG. 1 above) to learn only the MAC addresses of the edge nodes and not of the user nodes. In some embodiments, the interconnect nodes can learn these MAC addresses regardless of the VPLS instances they may or may not serve.

Thus, the number of MAC addresses learned by the interconnect nodes, and the size of their MAC tables, are considerably reduced.

In some embodiments that are described hereinbelow, packets that originate in one ring (denoted the source ring) and are destined to another ring (denoted the destination ring) are marked with an interconnect identifier (IID), which identifies the interconnect node in the source ring via which the packet is to be forwarded to the destination ring. The interconnect identifiers are assigned to the interconnect nodes so that their values are unique within each ring. Since the number of interconnect nodes in each ring is usually small, the interconnect identifier can usually be represented by four bits or less. One value, in the present example "0000," is assigned to all non-interconnect ring nodes. The IID can be inserted in various fields of the packet header, such as in a Virtual LAN (VLAN) tag, in an MPLS label, in reserved bits of the RPR header, or in any other suitable field.

When a packet is sent over the source ring and reaches an interconnect node, the interconnect node extracts the identifier and compares it with its own identifier. If the values match, the interconnect node makes a decision to strip the packet from the source ring and forward it over its external port to the destination ring. Otherwise, the interconnect node passes the packet along the ring without further processing. When the interconnect node in the destination ring accepts a packet from the source ring over its external port, the node attaches its own IID to the packet, for use in the MAC learning process of the ring nodes in the destination ring.

Note that the decision rules and logic defined herein are typically added on top of the standard IEEE 802.17 copy/strip rules carried out by the ring nodes.

In some embodiments, each ring node is pre-configured with the appropriate path via the ring for reaching each interconnect node. The path definition usually comprises a selection of the ringlet to be used, and the number of ring segments to traverse (also referred to as Time To Live—TTL) in order to reach the interconnect node. The ring nodes format the RPR packets.

Forwarding Method Description

Figure 3:
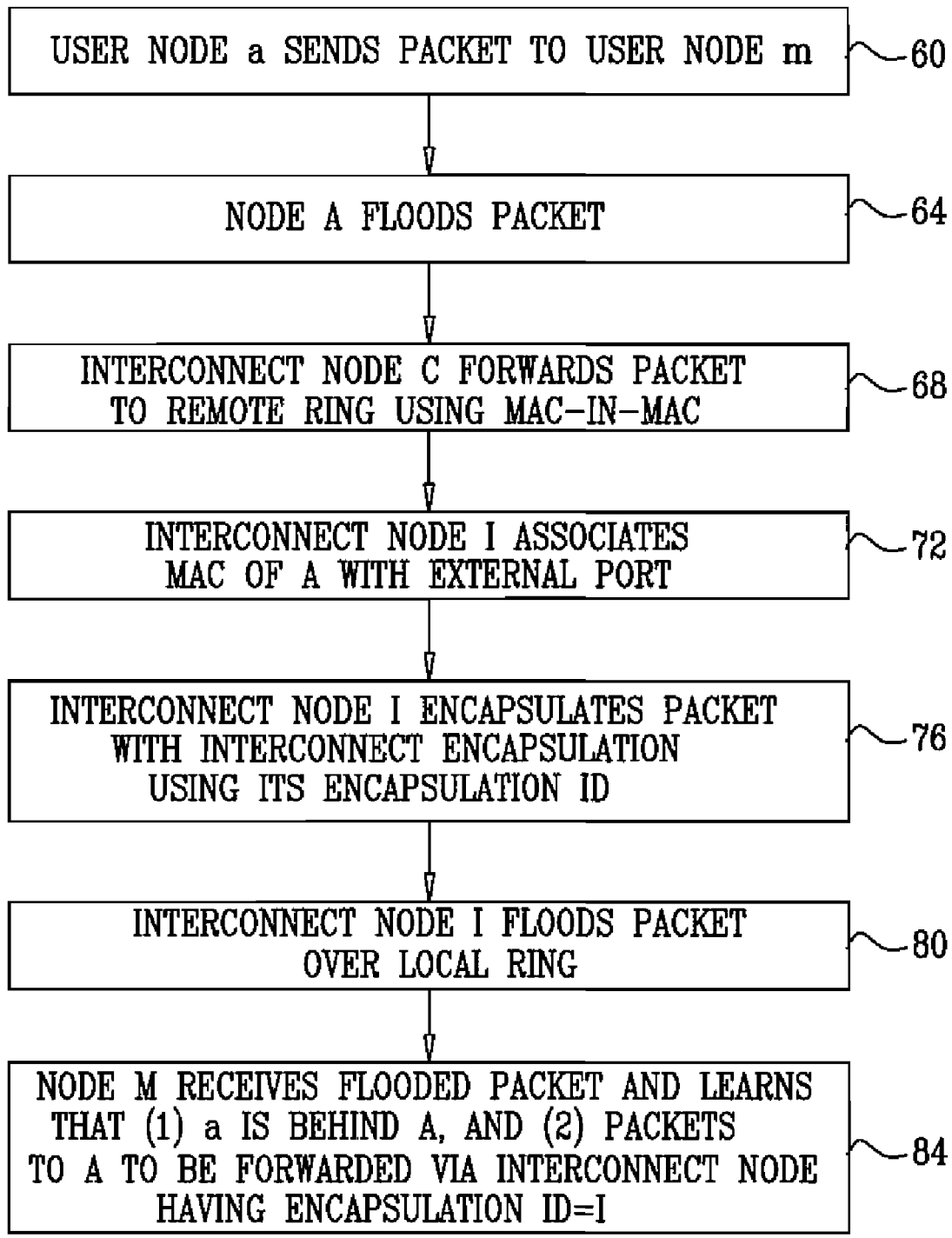
FIGS. 3 and 4 are flow charts that schematically illustrate methods for forwarding packets in a communication network, in accordance with an embodiment of the present invention.
Figure 4:
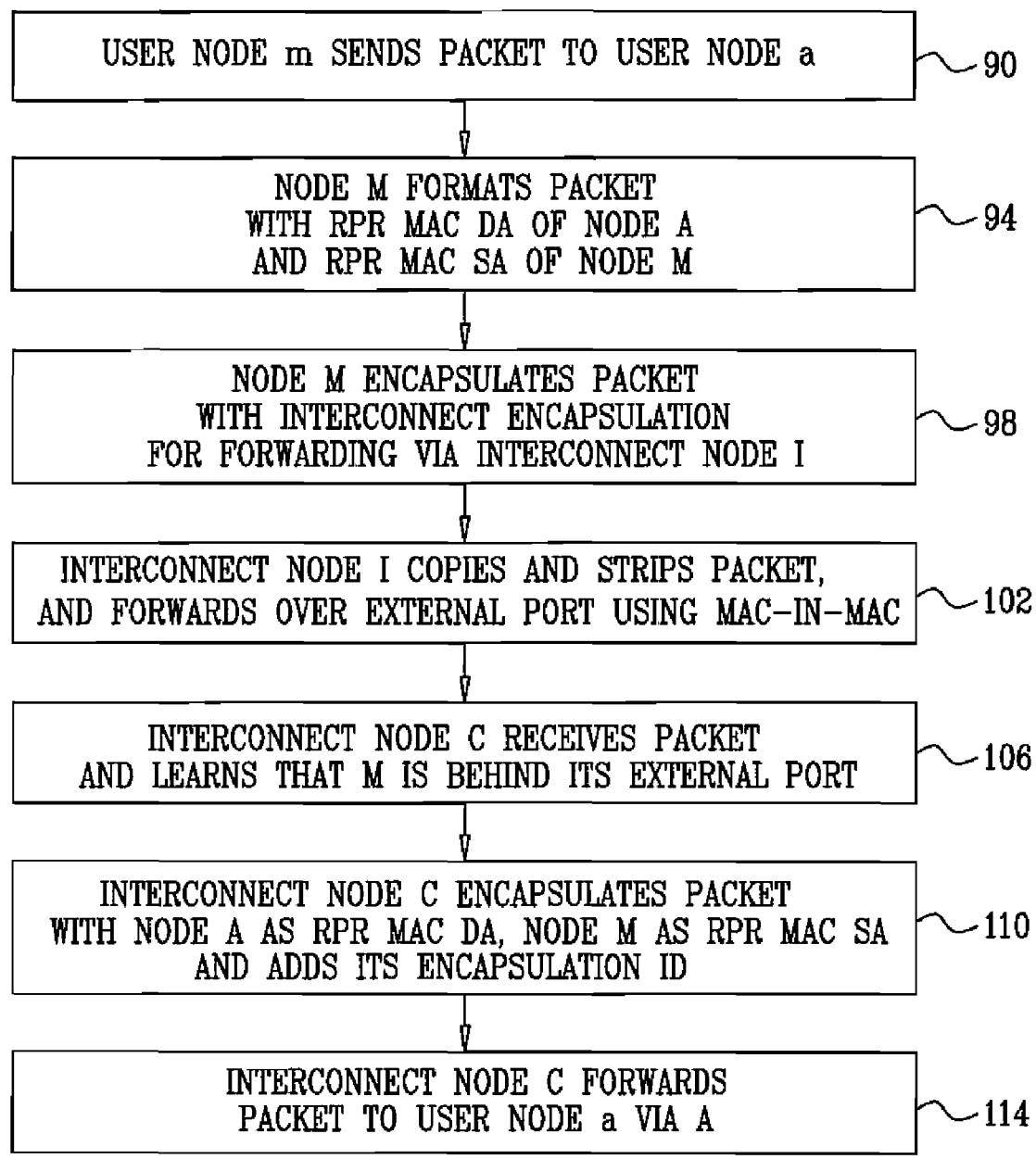

FIGS. 3 and 4 are flow charts that schematically illustrate methods for forwarding packets in communication network 20, in accordance with an embodiment of the present invention. For ease of explanation, the ring nodes are labeled A,B, C, . . . ,M, and the two user nodes are labeled a and m, as shown in FIG. 1 above.

The method of FIG. 3 begins with user node a in ring 24B sending a data packet to user node m in ring 24A, at an initial sending step 60. The packet header has the format [m,a], i.e., the MAC address of user node m as the destination address (DA) and the MAC address of user node a as the source address (SA).

Ring node A receives the packet. Initially, ring node A does not have information as to where to forward the packet. Therefore, ring node A broadcasts the packet, at a source ring flooding step 64. Ring node A transmits the packet with a Multicast (MC) destination address (DA) and with its own MAC address as the source address (SA) Thus, the packet header now has the format [MC,A,m,a].

Interconnect node C accepts the flooded packet and continues to broadcast it. In particular, node C forwards the packet over its external port to interconnect node I in ring 24A using MAC-in-MAC, at an external forwarding step 68.

Interconnect node I accepts the flooded packet and learns that ring node A is located behind its external port, at an interconnect MAC learning step 72. Interconnect node I updates its MAC table with the learned association between the MAC address of ring node A and the external port.

Interconnect node I encapsulates the flooded packet in order to continue flooding the packet over ring 24A, at an encapsulation step 76. Node I uses the MC address as the RPR DA MAC, and the MAC address of ring node A as the RPR SA MAC. Node I also encapsulates the packet with its own interconnect identifier as a source IID and 0 as a destination IID. The packet header thus has the format [MC,A,m,a,0, $OF_I$], wherein $OF_I$ denotes the IID value of interconnect node I. Interconnect node I then floods the packet over ring 24A, at a destination ring flooding step 80.

Ring node M receives the flooded packet and updates its MAC table accordingly, at a destination MAC learning step 84. Node M learns from the packet that user node a is behind ring node A that is located in another ring, and that packets to ring node A should be forwarded via the interconnect node whose IID is $OF_I$. Ring node M forwards the packet to user node m.

FIG. 4 describes the forwarding process when the initial MAC learning process of FIG. 3 above has already been performed. The method of FIG. 4 begins with user node m sending a data packet to user node a, at a sending step 90. The method assumes that nodes I and M carried out the MAC learning process described in FIG. 3 above.

Ring node M formats the packet for transmission, at a source formatting step 94. Node M uses the MAC address of node A as the RPR MAC DA (even though node A is not a member of ring 24A) and the MAC address of ring node M as the RPR MAC SA. Node M encapsulates the packet with the IID of interconnect node I as the destination IID, and its own IID ("0") as the source IID, at a source encapsulation step 98. The packet header now has the format [A,M,a,m,$OF_I$,0].

Interconnect node I receives and processes the packet, at a source interconnection step 102. Node I copies and strips the packet from the ring, even though the RPR MAC DA of the packet is not I, since the destination identifier matches its own ($OF_I$). Node I queries its MAC table and, as a result of the entry added at step 72 of the method of FIG. 3 above, forwards the packet on the external port using standard MAC-in-MAC.

Interconnect node C in ring 24B receives the packet, at a destination interconnection step 106. Node C learns that MAC address M is behind its external port, and updates its MAC table accordingly. Node C formats and encapsulates the packet, at a destination formatting step 110. Node C uses the original DA (A) as the MAC RPR DA (since ring node A is a member of ring 24B) and the original SA (M) as the RPR MAC SA (so that node A can learn where M is). Node C encapsulates the packet with its own interconnect identifier ($OF_C$) as the source IID (so that node A can learn that node M can be reached through interconnect node C), and 0 as the destination identifier (since ring node A is a member of ring 24B and the packet will be stripped by node A according to the standard RPR rules). Note that a ring node that is not defined as an interconnect node does not copy or strip packets based on the IID value. The packet header now has the format [A,M,a,m,0,$OF_C$].

Interconnect node C forwards the packet to ring node A, which in turn forwards it to user node a, at a destination ring forwarding step 114.

The configuration of FIG. 1 above and the method descriptions of FIGS. 3 and 4 above refer to a single interconnection between two rings, and to a single VPLS instance. In alternative embodiments, network 20 may comprise any number of rings and may deploy any number of VPLS instances. The VPLS instances can be identified using any suitable means, such as using a VLAN tag or MPLS label. A pair of rings can be connected by multiple interconnecting links. In some cases, different VPLS instances may use different interconnections. In particular, a certain ring node can be defined as an interconnect node for some VPLS instances and as a non-interconnect node for other instances.

Figure 5A:
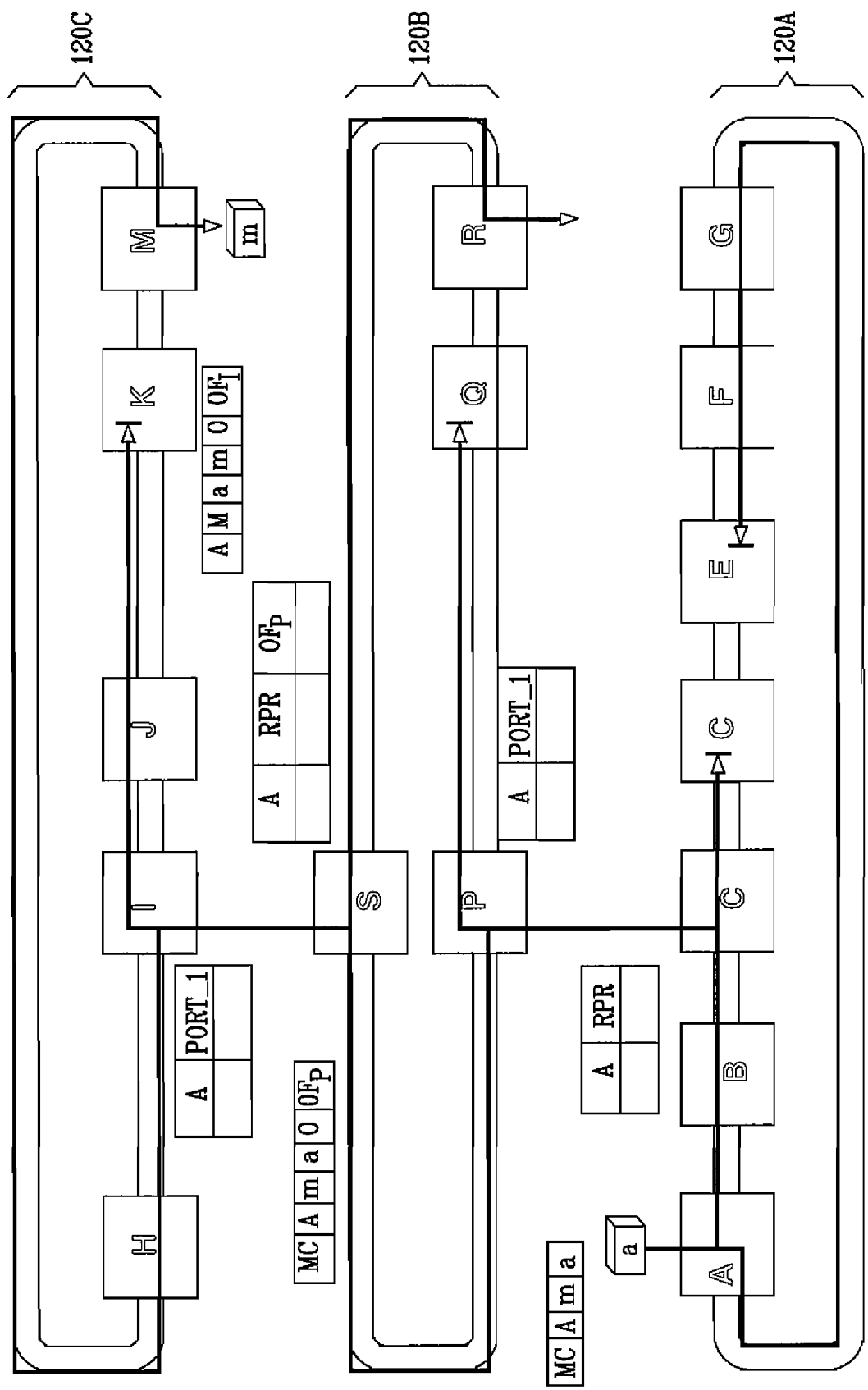
FIGS. 5A and 5B are block diagrams that schematically illustrate packet forwarding in a communication network, in accordance with another embodiment of the present invention.
Figure 5B:
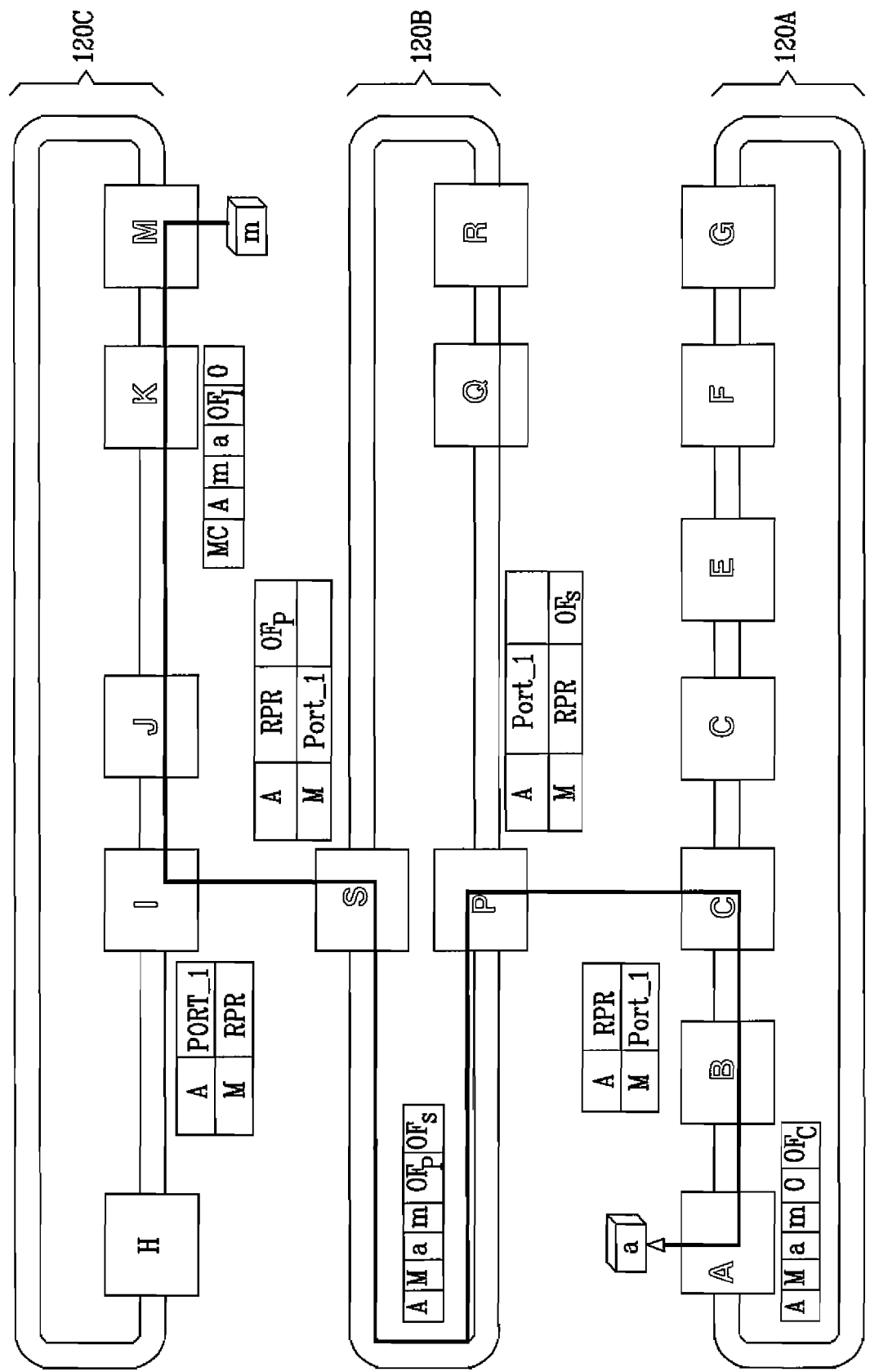

FIGS. 5A and 5B are block diagrams that schematically illustrate packet forwarding in a communication network, in accordance with another embodiment of the present invention. The configuration of FIGS. 5A and 5B shows a situation in which two rings 120A and 120C are interconnected via a third ring 120B.

FIG. 5A shows the initial flooding-based MAC learning process that occurs when a user node labeled a in ring 120A sends a packet to a user node labeled m in ring 120C. The packet produced by user node a has a header format of [MC, A,m,a], similarly to the packet produced at initial sending step 60 of the method of FIG. 3 above. The packet is flooded over ring 120A. An interconnect node labeled C forwards the packet via an interconnect node labeled P to ring 120B, and node P floods the packet over ring 120B. Using the rules explained above, the packet flooded in ring 120B has a packet header having the format [MC,A,m,a,0,OF$_p$].

The MC packet is then forwarded by an interconnect node labeled S via an interconnect node labeled I to ring 120C. The packet forwarded in ring 120C has a packet header having the format [A,M,a,m,0,OF$_I$]. The MAC table of each interconnect node is shown in the figure.

FIG. 5B Shows the process of sending a directed packet from node m in ring 120C to node a in ring 120A, assuming the MAC learning process of FIG. 5A above has already taken place. The figure shows the header field format of the packets in each stage of the process, and the MAC tables of the interconnect nodes.

In some embodiments, a particular interconnect node may be connected to multiple rings via respective multiple external ports. In such cases, the interconnect node learns to which external port a packet has to be forwarded by examining the external MAC addresses in the packet (i.e., the MAC addresses of the edge node and not of the user nodes). This process is in accordance with conventional bridging functionality, except for the fact that the node uses MAC-in-MAC.

For example, in the configuration of FIGS. 5A and 5B above, nodes S and P may comprise the same node, which is connected to rings 120AS and 120B using two external ports. In this example, the interconnect node carries out conventional bridging operation using the MAC-in-MAC addresses, except for the fact that before MAC learning is completed the packet is flooded, using the encapsulation rules defined herein, over ring 120B as well. This additional flooding operation is performed since the VPLS in question may have participating users in ring 120B. As another example, the functionality of nodes 30B and 30H may be embodied in a single node, which is a member of both rings 24A and 24B. In this case, link 28 is omitted and the inter-ring traffic flows internally within the common interconnect node.

In some cases, an interconnect node may comprise a Connection Termination Point (CTP) of a certain VPLS instance (i.e., serve user nodes using the VPLS instance), and also perform interconnection functionality for the same VPLS instance. In these embodiments, the interconnect node processes the packets addressed to the local user nodes using the standard IEEE 802.17 RPR rules, and processes the packets addressed to user nodes in other rings using standard MAC-in-MAC rules for an edge node. Flooding of packets having unknown MAC addresses that originate in the served CTP is performed using the method of FIG. 3 above.

In some embodiments, when a certain node performs packet flooding in the methods described herein, the node may limit the scope of the flooding operation, so that the flooded packet will not necessarily reach the entire network. For example, the scope can be limited so that the flooded packet will reach only up to the farthest node, which serves a user node using the VPLS instance in question or acts as an interconnect node for this VPLS instance. The node can limit the flooding scope by limiting the value of the TTL field of the packet, as defined in the IEEE 802.17b standard, cited above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   in a communication network that includes multiple ring nodes arranged in at least first and second ring networks, which are connected by one or more of the ring nodes serving as interconnect nodes, accepting a data packet from a source user node served by a first ring node in the first ring network for forwarding to a destination user node served by a second ring node in the second ring network;
   attaching to the data packet in the first ring network an identifier that identifies an interconnect node in the first ring network though which the data packet is to be forwarded to the second ring network, and forwarding the data packet over the first ring network;
   wherein attaching the identifier comprises learning at the first ring node that the data packet is to be forwarded to the second ring network though the interconnect node based on a previous data packet which:
       originated in another source user node served by the second ring node,
       was addressed to another destination user node served by the first ring node, and
       was forwarded though the interconnect node; and
   accepting the data packet at the interconnect node, and responsively to the identifier, forwarding the data packet from the interconnect node to the second ring network; and
   forwarding the data packet over the second ring network to the destination user node.

2. The method according to claim 1, wherein the first and second ring networks conform to a Resilient Packet Ring (RPR) standard.

3. The method according to claim 1, wherein the data packet is associated with a Virtual Private Local Area Network Service (VPLS).

4. The method according to claim 1, wherein forwarding the data packet comprises stripping the data packet from the first ring network and forwarding the data packet to the second ring network when the identifier identifies the interconnect node, and passing the data packet over the first ring network when the identifier does not identify the interconnect node.

5. The method according to claim 1, wherein learning that the data packet is to be forwarded through the interconnect node comprises accepting the previous data packet by the interconnect node, attaching the identifier that identifies the interconnect node to the previous data packet, forwarding the previous data packet over the first ring network to the first ring node, forming at the first ring node an association between a Medium Access Control (MAC) address of the second ring node and the identifier, and storing the association in a MAC table at the first ring node.

6. The method according to claim 1, wherein learning that the data packet is to be forwarded through the interconnect node comprises accepting the previous data packet by the interconnect node over a port, and learning that subsequent data packets to the second ring node are to be forwarded to the second ring network over the port.

7. The method according to claim 6, wherein learning that the subsequent data packets to the second ring node are to be forwarded over the port comprises forming an association between the port and a Medium Access Control (MAC) address of the second ring node, and storing the association in a MAC table at the interconnect node.

8. The method according to claim 1, wherein the previous data packet comprises a flooded data packet having a multicast destination address.

9. The method according to claim 8, wherein the multicast destination address has a limited multicast scope.

10. The method according to claim 1, wherein attaching the identifier comprises embedding the identifier in one of a Virtual Local Area Network (VLAN) tag, a Multi-Protocol Label Switching (MPLS) label and a Resilient Packet Ring (RPR) header of the data packet.

11. The method according to claim 1, wherein forwarding the data packet over the first ring network comprises pre-configuring a path between a ring node serving the source user node in the first ring network and the interconnect node, and forwarding the data packet over the pre-configured path.

12. A communication network comprising first and second pluralities of ring nodes arranged in respective first and second ring networks, the first plurality of nodes comprising:
   an interconnect node, which is connected by a communication link to at least one of the nodes in the second plurality; and
   a first ring node, which is configured to accept a data packet from a source user node for forwarding to a destination user node served by a second ring node in the second ring network, to attach to the data packet an identifier that identifies the interconnect node in the first ring network through which the data packet is to be forwarded to the second ring network, and to forward the data packet over the first ring network,
   wherein the interconnect node is arranged:
      to learn that the data packet is to be forwarded to the second ring network through the interconnect node based on a previous data packet which:
         originated in another source user node served by the second ring node,
         was addressed to another destination user node served by the first ring node, and
         was forwarded through the interconnect node; and
      to accept the data packet, and responsively to the identifier, to forward the data packet to the second ring network, so as to forward the data packet over the second ring network to the destination user node via the second ring node.

13. The network according to claim 12, wherein the first and second ring networks conform to a Resilient Packet Ring (RPR) standard.

14. The network according to claim 12, wherein the data packet is associated with a Virtual Private Local Area Network Service (VPLS).

15. The network according to claim 12, wherein the interconnect node is arranged to strip the data packet from the first ring network and to forward the data packet to the second ring network when the identifier identifies the interconnect node, and to pass the data packet over the first ring network when the identifier does not identify the interconnect node.

16. The network according to claim 12, wherein the interconnect node is arranged to accept the previous data packet, to attach the identifier that identifies the interconnect node to the previous data packet and to forward the previous data packet over the first ring network to the first ring node, and wherein the first ring node is arranged to form an association between a Medium Access Control (MAC) address of the second ring node and the identifier, and to store the association in a MAC table at the first ring node.

17. The network according to claim 12, wherein the interconnect node is arranged to accept the previous data packet over a port and to learn that subsequent data packets to the second ring node are to be forwarded to the second ring network over the port.

18. The network according to claim 17, wherein the interconnect node is arranged to learn that the subsequent data packets to the second ring node are to be forwarded over the port by forming an association between the port and a Medium Access Control (MAC) address of the second ring node, and storing the association in a MAC table at the interconnect node.

19. The network according to claim 12, wherein the previous data packet comprises a flooded data packet having a multicast destination address.

20. The network according to claim 19 wherein the multicast destination address has a limited multicast scope.

21. The network according to claim 12, wherein the first ring node is arranged to embed the identifier in one of a Virtual Local Area Network (VLAN) tag, a Multi-Protocol Label Switching (MPLS) label and a Resilient Packet Ring (RPR) header of the data packet.

22. The network according to claim 12, wherein the first ring node is arranged to forward the data packet over a pre-configured path between the first ring node and the interconnect node.

* * * * *